United States Patent [19]
Allsop et al.

[11] Patent Number: 4,934,724
[45] Date of Patent: Jun. 19, 1990

[54] COMBINATION BEAM SEAT SUPPORT

[75] Inventors: James D. Allsop, Bellingham; David E. Calapp, Bellevue, both of Wash.

[73] Assignee: Allsop, Inc., Bellingham, Wash.

[21] Appl. No.: 333,891

[22] Filed: Apr. 7, 1989

[51] Int. Cl.$^5$ .......................... B62K 19/04; B62J 1/02
[52] U.S. Cl. .................... 280/281.1; 280/283; 280/275; 264/258; 267/30; 267/132; 267/133; 248/598
[58] Field of Search ............... 280/220, 226.1, 275, 280/281.1, 283; 248/548, 613, 635; 264/258, 257; 267/30, 131, 132, 133

[56] References Cited

U.S. PATENT DOCUMENTS

| | | | |
|---|---|---|---|
| 423,471 | 3/1890 | Easthope | 280/276 |
| 457,080 | 8/1891 | Garford | 280/275 |
| 468,823 | 2/1892 | O'Connor | 56/70 |
| 505,753 | 9/1893 | Cocken | 280/270 |
| 518,338 | 4/1894 | Whitaker | 280/275 |
| 953,697 | 4/1910 | Kuebodeaux | 280/277 |
| 1,193,977 | 8/1916 | Bereth | 267/133 |
| 1,416,942 | 5/1922 | Brooks | 297/196 |
| 1,469,136 | 9/1923 | Ziska, Jr. | 297/196 |
| 2,160,034 | 5/1939 | Schwinn | 280/276 |
| 2,244,709 | 6/1941 | Kinzel | 280/281.1 |
| 2,283,671 | 5/1942 | Finlay et al. | 280/284 |
| 2,446,731 | 8/1948 | Wheler | 280/284 |
| 2,485,484 | 10/1949 | Dean | 280/277 |
| 2,497,121 | 2/1950 | Fletcher | 280/261 |
| 2,828,801 | 4/1958 | Papst | 267/132 X |
| 2,976,056 | 3/1961 | Henry | 280/277 |
| 3,459,441 | 8/1969 | Hornsby | 280/276 |
| 3,730,509 | 5/1973 | Jorn | 267/30 X |
| 3,833,242 | 9/1974 | Thompson, Jr. | 280/281.1 |
| 4,162,797 | 7/1979 | McBride | 280/275 |
| 4,421,337 | 12/1983 | Pratt | 280/277 |

FOREIGN PATENT DOCUMENTS 0956293  1/1950  France ............... 280/281.1

OTHER PUBLICATIONS

*Bicycle Guide*, Aug. 1988, pp. 75–78.

*Primary Examiner*—Charles A. Marmor
*Assistant Examiner*—Mitchell Bompey
*Attorney, Agent, or Firm*—Christensen, O'Connor, Johnson & Kindness

[57] ABSTRACT

A seat support for a vehicle including a combination beam interconnected with the vehicle at one end and having a seat mounted on its opposite end. The combination beam includes longitudinally extending load support members of relatively high modulus of elasticity spaced from each other along at least a portion of their length to define a gap. An elastomeric shock absorbing material is positioned in the gap. The material being deformed responsive to relative movement of the structural members of the beam when the beam is bent under load such that the material absorbs shock and vibration.

14 Claims, 4 Drawing Sheets

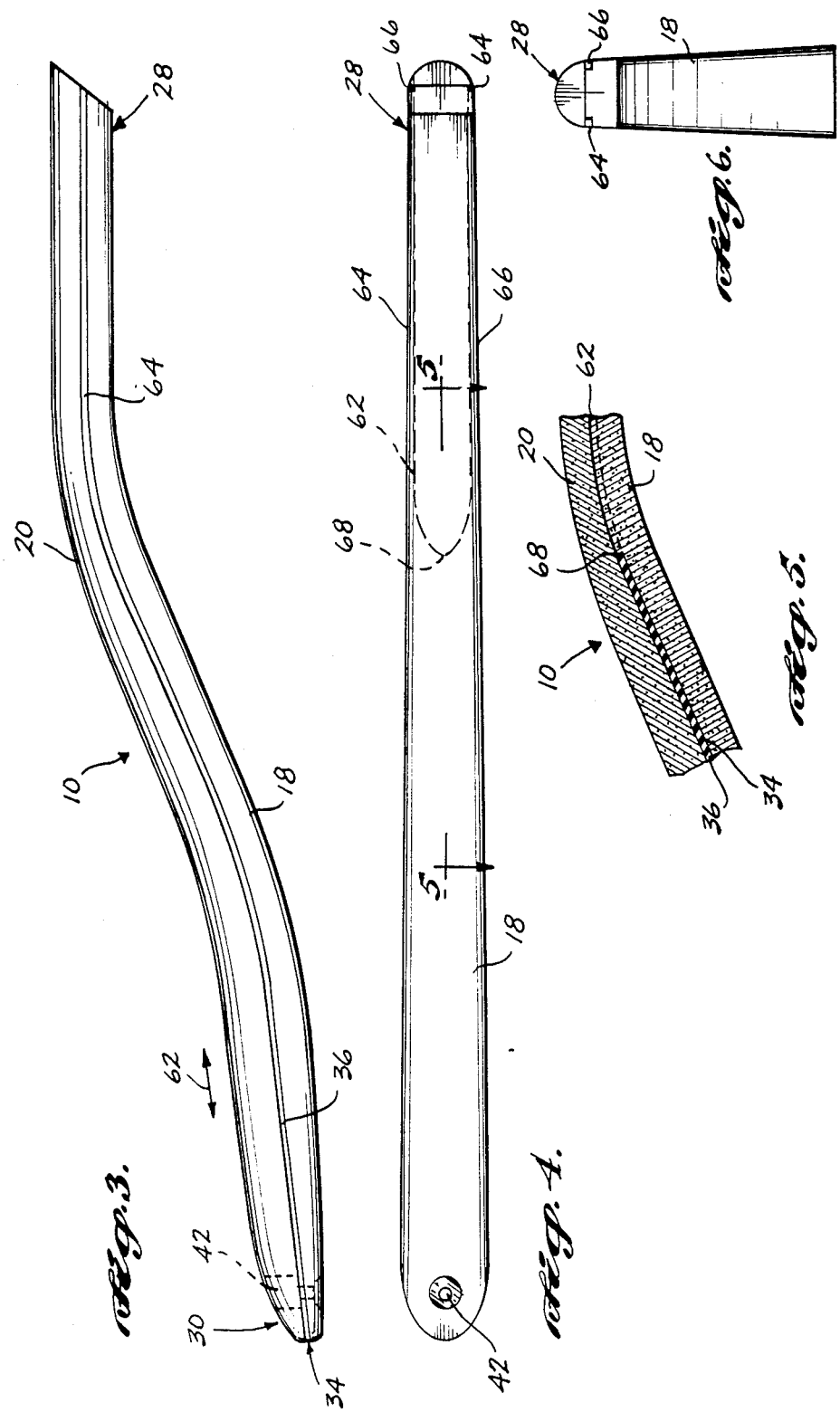

COMBINATION BEAM SEAT SUPPORT

BACKGROUND OF THE INVENTION

1. Field of the Invention

This invention relates, in general, to a shock and vibration absorbing seat support for a vehicle and, in particular, to a combination beam seat support including a shock and vibration damping layer positioned between relatively movable structural members to absorb vibration and shock loads. As disclosed, the invention has particular application to bicycles, but is not limited thereto.

2. Description of the Prior Art

The problem of eliminating vibration and shocks to smooth the ride for a person sitting upon a vehicle traveling over rough ground has been a serious one since the development of the first vehicle. Solutions have typically involved separating the wheels of the vehicle from the vehicle frame by means of springs and shock absorbers as well as spring mounting the vehicle seat on the vehicle frame. In automobiles and tractors, for example, seats have been mounted using both coil springs, leaf springs and combinations thereof.

Referring particularly to the bicycle art wherein the present invention has relevant application, the seat support almost universally takes the form of a rigid tubular member inserted in a cooperating near vertical tube portion of a rigid bicycle frame. A seat, which may include a form of resilient spring cushioning, is typically mounted to the top of the tubular seat support.

The inflated tires mounted on the wheels are the initial and sometimes the only means for shock absorption on a bicycle. Low-pressure balloon tires of the type typically used for so-called "mountain" bikes can provide some limited shock and vibration absorption, but these bikes are often used in terrain where such severe shocks and vibrations are encountered that the ride smoothing effect of the tires is insufficient. Further, in other types of bikes where tire size is small and air pressure within the tire high, the ability of the tire to absorb shocks and vibration is near nonexistent. Consequently, most road shocks and vibrations experienced by present bicycles are transmitted directly to the bicycle seat and, thence, to the rider. In extreme cases, such as during long-distance races or during mountain bike races, the abuse suffered by riders from continual shocks and vibrations has been known to lead to temporary nerve damage, muscle cramps, and severe rider discomfort. See *Bicycle Guide*, Aug. 1988, pages 75-78. Even during more normal riding conditions, shocks and vibrations create fatigue, decrease rider comfort and cause pain, particularly in that portion of the anatomy in contact with the bicycle seat.

In addition, the use of metal frames for bicycles has principally been driven by the requirement that the frame be able to withstand vibration and the substantial rider weight loads that are often unresiliently placed on the bicycle frame as a result of the bicycle hitting a severe bump. It is for this reason that lightweight bicycle frames, such as those formed of resin-bounded fibers surrounding rigid foam cores, have not found widespread acceptance.

Many attempts have been made to improve the spring mounting of bicycle seats, including the use of leaf springs as shown, for example, in U.S. Pat. Nos. 1,469,136; 2,244,709; and, 2,497,121. Such constructions have the drawback of allowing the rider to be alternately depressed downwardly and catapulted upwardly in a magnified and relatively uncontrolled fashion. In addition, such seats tend to sway laterally when the bicycle turns or rotates torsionally in an unstable and uncomfortable manner. A combination leaf spring and parallel motion bar seat support is shown in U.S. Pat. No. 1,416,942. A tricycle having a coil spring seat support allowing substantial vertical seat movement is shown in U.S. Pat. No. 4,162,797.

The problem of reducing vibration and shock to a rider has also been attempted to be solved through the use of shock absorbers and springs between the bicycle frame and wheels rather than between the seat and the frame. Examples of such arrangements developed over the past ninety years are shown in U.S. Pat. Nos. 423,471; 457,080; 468,823; 505,753; 518,338; 953,697; 2,160,034; 2,283,671; 2,446,731; 2,485,484; 2,976,056; 3,459,441; and, 4,421,337. These patents show the seriousness of the problem solved by the present invention and the numerous attempts to alleviate shocks and vibrations delivered to bicycle riders which have been made in the past. In spite of these attempts, almost all bicycle seats in use today have little ability to absorb vibration or shock. Substantial need still exists in the bicycle art, as well as in the vehicle seat support art in general, for an improved shock and vibration absorbing seat support.

SUMMARY OF THE INVENTION

The present invention discloses a seat support for a vehicle such as a bicycle including a combination beam adapted to be connected to the vehicle at one end and supporting a seat at its cantilevered opposite end. In one embodiment, the combination beam includes a first longitudinal portion fixedly connected to the vehicle, and a second longitudinal portion adapted to move with respect to the first portion in response to bending loads placed on the combination beam such as shock and vibration loads encountered as the vehicle and rider move over rough terrain. The first and second portions of the combination beam are preferably joined together along a portion of the beam to provide lateral and torsional stiffness and stability to the beam. An energy absorbing material of low durometer hardness, such as an elastomeric member or layer, is positioned between the first and second portions of the beam such that relative movement of the second portion of the combination beam with respect to the first portion causes the elastomeric material to be deformed, thus absorbing energy and cushioning the seat mounted on the beam from shocks and vibration encountered by the vehicle itself. A combination beam suitable for mounting on a conventional bicycle and a lightweight bicycle and bicycle frame including integral combination beam seat supports are disclosed, but it will be understood that shock absorbing combination beams made in accord with the teaching of the present invention may also be used with other types of vehicles which are subject to vibration and shock loads.

Other features and advantages of the present invention will be apparent from the following description taken in conjunction with the accompanying drawings, in which like reference numerals designate the same or similar parts.

BRIEF DESCRIPTION OF THE DRAWINGS

FIG. 3 is a side elevation view of one embodiment of the combination beam seat support made according to the present invention.

FIG. 4 is a bottom plan view of the combination beam seat support of FIG. 3 showing the interconnection between the upper and lower portions of the beam in dashed line.

FIG. 5 is a section view taken along lines 5—5 in FIG. 4.

FIG. 6 is a right-side elevational view of the combination beam seat support of FIG. 3.

DETAILED DESCRIPTION OF THE INVENTION

Figure 1:
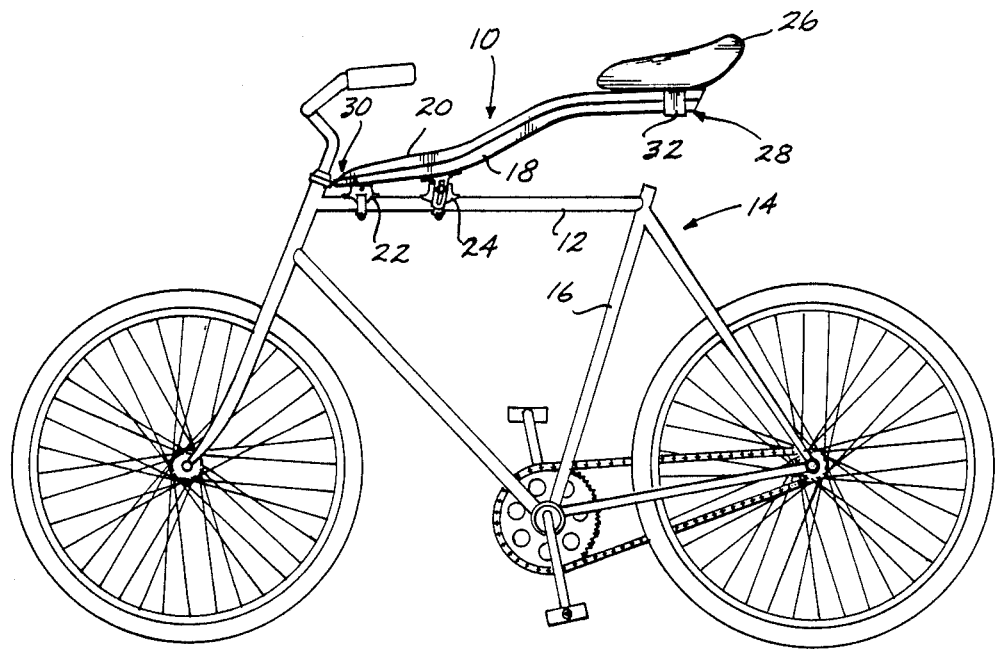
FIG. 1 is a side elevation view of a conventional bicycle including the combination beam seat support of the present invention.

Referring initially to FIG. 1, a combination beam seat support 10 is shown mounted on the horizontal tube 12 of a conventional bicycle 14. As shown, the conventional tubular seat support which is adapted to be slipped downwardly into hollow frame tube 16 has been removed from the bicycle frame. While the combination beam seat support of the present invention finds significant utilization in connection with cycles including bicycles, it will be understood that the present invention will reduce vibration and shock to the seat of any type of vehicle moving over rough terrain. Thus, while a particular unique mounting arrangement of one embodiment of the present invention on tube 12 of a bicycle frame is disclosed in FIGS. 1 and 2, it will be understood that other mounting arrangements, either for bicycles, or for other types of vehicles, may readily be used in connection with the present invention.

Combination beam seat support 10 includes a first lower portion 18 and a second overlying upper portion 20. Portion 18 is connected to beam 12 by pivotal mounting means 22, and the angular position of the combination beam with respect to tube 12 is controlled by pivot control means 24. A conventional seat 26 is shown mounted on the end 28 of combination beam 10 distal from beam end 30. A conventional seat mounting means 32 adapted to surround and grip end 28 is shown mounting seat 26 thereon. It will understood that seat 26 may be moved longitudinally along end 28 by releasing and tightening mounting means 32 to accommodate changes in the height of the seat above the bicycle frame. Typically, it is desired to have the mounting means 32 positioned about 24 inches rearward of mounting means 22, although this is a matter of rider choice.

As illustrated, beam 10 is shown curved along the central portion of its length such that the forward portion 30 of the beam is generally adjacent tube 12 to readily allow the rider to straddle the combination beam when standing astride the bicycle. End 28 of the combination beam is shown positioned a distance above tube 12 to allow seat 26 room to move upwardly and downwardly in response to bending of beam 10 under rider weight and vibration and shock loads. The angle of beam 10 with respect to tube 12, and thus the height of seat 26 above tube 12 is principally determined by the comfort and leg length of the rider, it being understood that the seat should not be positioned so low that the end 28 of the beam 10 bottoms out against the upper end of tube 16 during bending.

Figure 2:
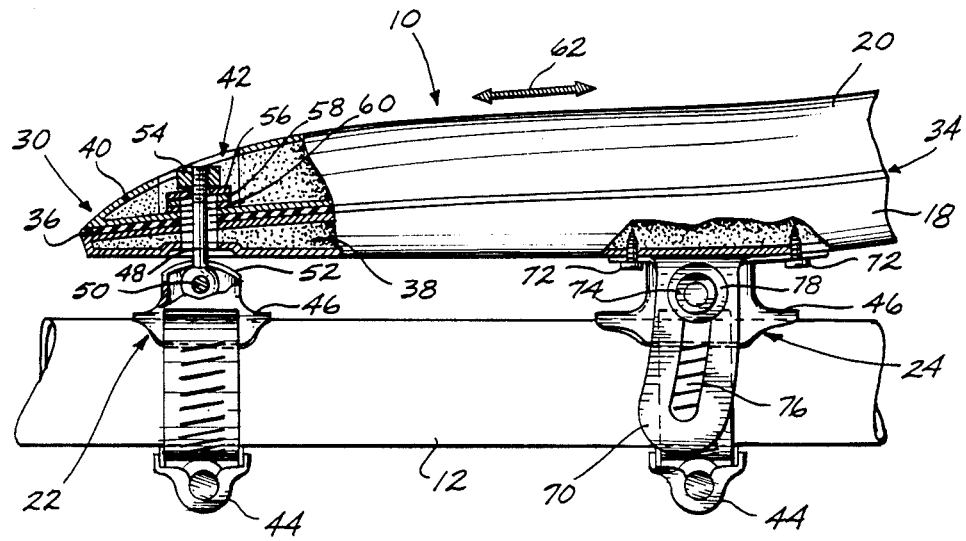
FIG. 2 is a partial cross-sectional view of one form of mounting and adjusting means for a combination beam seat support made according to the present invention.

Referring additionally to FIG. 2, it will be seen that combination beam seat support 10 includes a space or gap 34 between lower portion 18 and upper portion 20. As shown, gap 34 is filled with a layer of vibration and shock absorbing material 36. In a preferred embodiment, this material will have a low durometer hardness and will be elastomeric in nature. As used herein, elastomeric is meant to describe a material capable of being deformed by relative movement between the upper and lower portions of the beam 10 and then returning to its original shape, thus absorbing the kinetic energy of the relatively moving beam portions. The material must have a tendency to resist deformation or compression, thus slowing the relative movement of the upper and lower portions of the combination beam, and also a tendency to resiliently return to its original shape over a period of time. An elastomer made of polyurethane, having viscoelastic properties such that beam movement is resisted in both directions has been found to be a satisfactory material. Many elastomer materials having a relatively low modulus of elasticity and formed either in a layer or in other configurations sandwiched between or otherwise interconnected with the upper and lower portions of the combination beam, will also be satisfactory for use in this invention.

In a preferred embodiment, lower portion 18 and upper portion 20 of combination beam 10 are formed of a rigid foam material 38 encased within a hardened resin and fiber shell 40. Foam 38 may be a rigid polyurethane foam while shell 40 may be formed of fiberglass and epoxy resin. It will be understood that other foams and resins, as well as other fibers including graphite fibers, may also be satisfactorily used in the construction of these lightweight beam portions so long as the resulting product has the needed structural integrity and a relatively high modulus of elasticity. Of course, more conventional bicycle materials, such as steel or aluminum, may also be used in the combination beam construction with, however, the likely sacrifice of the advantages of weight reduction. Beams formed to include a plurality of elastomeric layers positioned between relatively rigid members are also considered to be within the scope of this invention. A beam constructed to have a vertical deflection at its free end of approximately 100 lbs. per inch has been found to be satisfactory the present invention. Of course, the beams can be made more or less resistant to bending by varying the glass structure, the size of the beam, the durometer of the elastomer or by other known techniques.

In one method of construction of the upper and lower portions of the combination beam, a braided fiberglass sock having its fibers generally oriented at 45° to the longitudinal dimension of the core is slipped over a preformed foam core. Unidirectional fiberglass elements are then laid thereover to additionally strengthen the beam. Other layers of fiberglass mat may be added at strategic load bearing areas such as the end pivot point, the fulcrum point adjacent pivot control 24, and the seat mounting end 28 of the beam portions and a second sock is then slipped thereover to hold these elements in place. The beam portion is then thoroughly wetted with resin and cured, preferably under pressure. After both beam portions are formed, they are joined along a portion of their length, typically by epoxy resin. One of the beam portions will typically include a raised platform on the surface to be joined to the other beam portion. In this way, gap 34 is formed in the completed combination beam 10. Other known construction techniques and materials may alternatively be used and are considered to be within the scope of this invention. After beam 10 is constructed, the layer of vibration-reducing material 36 is inserted within gap 34 preferably by placing beam member 10 in a mold and injecting the material into gap 34 under pressure.

As shown in FIG. 2, beam 10 is formed to include a vertical opening 42 through end 30 by means of which the beam is connected to beam mounting means 22. As illustrated, beam mounting means 22 includes a conventional hose clamp type mount 44 surrounding tube 12 and having bracket 46 mounted thereon atop beam 10. Other conventional connection means to beam 10 may also be used. Bracket 46 includes an upwardly extending threaded member 48 that is pivotally mounted therein by means of a conventional fastener 50 inserted through an opening in the bottom portion of the threaded member and through a cooperating opening in the laterally adjacent sides 52 of fitting 48. Threaded member 48 extends upwardly through opening 42 which extends through first lower portion 18, vibration dampening layer 36 and second upper portion 20.

A fastener, such as nut 54, is shown threaded onto the end of threaded member 48 which is adapted to bear upon a conventional washer 56 positioned therebelow. In order to allow upper member 20 of beam 10 to slide laterally with respect to fixed lower member 18 in the manner to be described hereafter, a pair of slotted washers 58 and 60 may be positioned below washer 56. To facilitate sliding, washer 58 may be a slip washer, i.e., a washer made of a material readily adapted to slip with respect to the surfaces of adjacent washers 56 and 60, such as a bronze washer positioned between two steel washers.

The described construction allows upper beam portion 20 to move laterally with respect to pinned lower portion 18 of the beam as indicated by arrow 62 in spite of the substantial vertical compression load carried by nut 54 and its associated washers generated by the weight of a rider sitting on the cantilevered end 28 of beam 10. The lateral movement of upper portion 20 with respect to lower portion 18 caused by the bending of beam 10 causes the elastomeric layer 36 in gap 34 to be deformed in shear. The deformation of layer 36, or more precisely the resistance to lateral movement of upper beam portion 20 provided by the elastomerically deformed material 36, slows and smoothes the movement of beam portion 20 and absorbs vibration and shock loads encountered by the wheels of the bicycle as it travels over rough terrain before they are transmitted to the seat 26. Likewise, body weight loads on seat 26 generated by rapid or sharp movements of the bicycle are slowed and dampened before transmission to the bicycle frame through combination beam 10.

Referring additionally to FIGS. 4 and 5, it will be seen that upper portion 20 and lower portion 18 of beam 10 are integrally connected adjacent beam end 28 as represented by the platform area within dashed line 62. Side channels 64 and 66 are provided adjacent area 62 to act as conduits for the elastomeric material when it is injected into gap 34 from end 30 of the beam as described heretofore. It will be understood that the elastomeric material flows to fill gap 34 until it encounters the prow 68 of the beam connecting platform 62 at which time the elastomeric material flows through channels 64 and 66 and exits the beam at end 28 as shown in FIG. 6.

As shown in FIG. 3, in one embodiment of the present invention the elastomeric material 36 will appear to fill a gap 34 that runs from end-to-end of beam 10. In reality, however, the elastomeric material only completely fills the gap in the area from end 30 of the beam to the prow 68 of the integral connecting member 62. The beam being sealed from there to its end 28 except for side channels 64 and 66. Again, it will be understood that the particular beam construction described above is but one preferred embodiment of the present invention and that other embodiments including, but not limited to, a beam formed of beam portions having interlocking surfaces and elastomeric material having other configurations and locations, are all considered to be within the scope of this invention.

It is believed that joining the upper and lower portions 18 and 20 of the combination beam adjacent end 28 in the manner described heretofore provides lateral and torsional stability to the beam 10, but it will be understood that other means of connecting these members either integrally or by the use of fasteners or surrounding clamp members may also be used and are considered to be within the scope of this invention. It is also considered that the elastomeric layer may extend from end-to-end of the beam, again assuming that lateral and torsional stability is provided to the beam in some other manner.

Referring again to FIG. 2, the angle through which combination beam 10 may be pivoted to raise or lower seat 26 to accommodate riders of different leg length and weight is shown to be controlled by pivot control means 24. Means 24 includes a conventional hose clamp connector 44 encircling tube 12 and adapted to hold a fitting 46 on the top portion of tube 12. A slotted bracket 70 is shown mounted by conventional fasteners 72 to the underside of bottom portion 18 of beam 10. A conventional pin clamp means such as cam lever clamp 74 and a cooperating threaded nut is inserted through washer 78 overlying a hole which extends through fitting 46 and is aligned with slots 76 in bracket 70 on opposite sides of fitting 46. It will be understood that by loosening the grip of cam lever clamp 74 on the sides of slotted brackets 70, beam 10 may be pivoted upwardly or downwardly. The cooperating fasteners may be tightened at any point along the travel of the beam 10 allowed by slots 76 to fix the seat 26 at a selected height above the bicycle frame.

Again, other conventional seat height adjusting means may be substituted for pivot control means 24 so long as the goals of easy adjustment and stable locking of the combination beam and seat at a desired height above the frame of the bicycle are achieved.

Referring additionally to FIG. 1, it will be understood that when a load is placed upon seat 26, the end 28 of beam 10 is bent downwardly. Absent gap 34, the bending of beam 10 would place the bottom portion of the beam 18 in compression while the upper portion 20 of the beam would be stretched in tension. The incorporation of slot 34 in the combination beam allows the tension forces developed in upper portion 20 during downward bending of beam 10 to be relieved as upper portion 20 slips longitudinally along lower beam portion 18. The placement of elastomeric material 36 in gap 34, resists and slows the movement of upper portion 20 over lower portion 18 in the area of gap 34 thus slowing and damping the bending of beam 10 and substantially eliminating the transmission of vibrations and shock loads through beam 10.

Referring additionally to FIGS. 3 and 5, it will be understood that the thickness of elastomeric material 36 may be increased in the area of beam end 30 and reduced at the opposite end of gap 34 in the area of beam portion interconnection point 68. The relative movement of upper portion 20 with respect to fixed portion 18 is greatest near beam end 30 while movement is reduced to near zero near connection point 68. Consequently, increasing the thickness of elastomeric material 36 in the area of beam end 30, with an associated increase in the size of gap 34 will improve the vibration and shock absorbing characteristics of beam 10 while also extending the life of the shock absorbing material.

Vibration or shock absorption may be viewed as the reduction of the frequency or amplitude of motion of a beam or other structural member. Assuming a solid beam 10 without a gap 34 or elastomeric material 36 therein, shocks and vibration encountered by the wheels of a bicycle as it travels over rough terrain would be transmitted through the beam to seat 26 without a reduction of frequency and possibly with an increase in amplitude as a result of the cantilevering of the beam. The provision of an elastomeric material within gap 34 and bonded to the adjacent surfaces of upper portion 20 and lower portion 18 of beam 10 allows the material to resist and slow the sliding movement of beam portion 20 with respect to beam portion 18 and thus the speed and distance at which the end 28 of beam 10 moves upwardly and downwardly. It is believed that the elastomeric material 36 absorbs the kinetic energy in the bicycle frame in the form of vibration and shock and transforms it into heat energy, which is dissipated.

While the above discussion has discussed the bending of beam end 28 downwardly under the weight load of a rider thus tensioning beam portion 20, it will be understood that the elastomeric material acts to resist movement of beam portion 20 in either direction with respect to beam portion 18 thus dampening vibration and shock when beam end 28 is moving upwardly as well as downwardly.

Again referring to FIG. 1, it will be understood that as upper beam portion 20 moves with respect to lower beam portion 18, the elastomeric material in gap 34 in the central curved portion of the combination beam is compressed as well as deformed in shear. The provision of a curve in combination beam 10 thus increases the energy absorption capability of the viscoelastic material in response to bending of the beam.

It will be appreciated that the beam mounting means 22 may be employed to control the bending characteristics of the beam 10. In this regard, the material composition of washer 58 may be selected to increase the friction with adjacent washers 56 and 60. Also, the engagement between the nut 54 and the threaded member 48 may be varied to change the compression load applied to elastomeric layer 36. This in turn results in a corresponding change in the ability of layer 36 to resist the movement of the upper beam portion 20 relative to the lower portion 18, thus controlling the stiffness of the beam 10.

Figure 8:
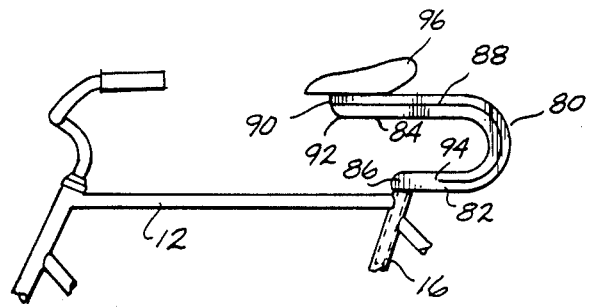
FIG. 8 is a partial side elevation view of an embodiment of a combination beam seat support made according to the present invention shown mounted on a conventional bicycle frame.

Referring additionally to FIG. 8, a combination beam 80 having a first portion 82 and a second adjacent portion 84 are integrally joined at beam end 86, is shown mounted on a conventional seat post inserted in bike frame tube 16. A shock and vibration absorbing elastomeric material 88 is positioned between portions 82 and 84 in a gap 90 which begins at beam end 92 and runs along the curved beam to the point 94 where the beam portions are integrally joined. This embodiment could include an integrally molded seat 96 or a seat interconnected to beam end 92 by conventional means. An advantage of this design is the removal of the beam as an obstacle to the straddling of frame tube 12 when the bicycler is standing astride the bicycle.

Figure 9:
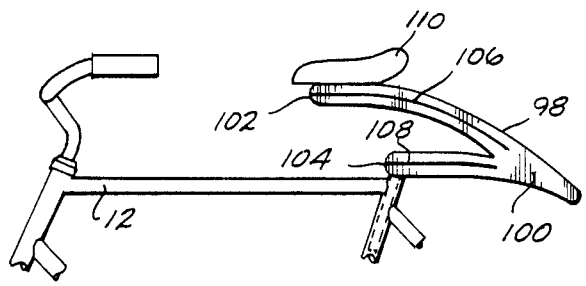
FIG. 9 is a partial side elevation view of another embodiment of a combination beam seat support made according to the present invention shown mounted on a conventional bicycle frame.

Referring additionally to FIG. 9, still another embodiment of a combination beam seat support is disclosed mounted on a conventional seat post and comprising a generally Y-shaped member 98 having an integral foot portion 100 which extends rearwardly to act as a fender or shield for spray coming off of the back wheel of the bicycle and gaps 102 and 104 filled with elastomeric material 106 and 108 in each leg of the Y. Again, seat 110 may be integrally molded with this member or affixed thereto by conventional means.

Figure 7:
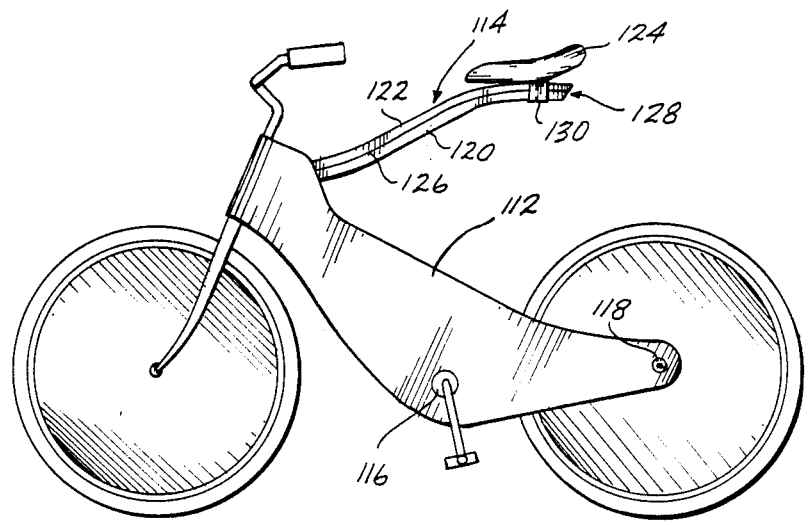
FIG. 7 is a side elevation view of an embodiment of a bicycle including a frame having an integral combination beam seat support made according to the present invention.

Referring to FIG. 7, an embodiment of a bicycle having a lightweight frame member 112 formed as a single piece of lightweight fiber and resin material is disclosed. It will be understood that the particular shape of this frame member is illustrative only. The use of a combination beam 114 to reduce shock and vibration loads to the frame 112 allows lightweight resin and fiber materials to be used in its construction. It is contemplated that metal inserts 116 and 118 would be incorporated into the lightweight frame member to strengthen it in areas of particular mechanical stress.

As shown in FIG. 7, combination beam 114 is integrally formed with frame 112 and includes a lower portion 120 adapted to be compressed under load an upper portion 122 adapted to be placed in tension responsive to the placement of loads upon seat 124, and elastomeric material 126 residing in gap 128 between the upper and lower portions. In the illustrated construction, seat support means 130 while interconnected with combination beam 114 must allow the upper and lower portions to slide relative to each other. It will be understood that a combination beam 10 such as that shown in FIG. 1 may be used with the lightweight molded frame shown in FIG. 7 instead of the integral beam 114. Alternatively, the lower portion 120 of the combination beam could be integral with the frame 112 while top portion 122 is connected thereto adjacent the seat supporting end and is adapted to slide with respect thereto in the area of the combination beams interconnected with frame 112.

Figure 10:
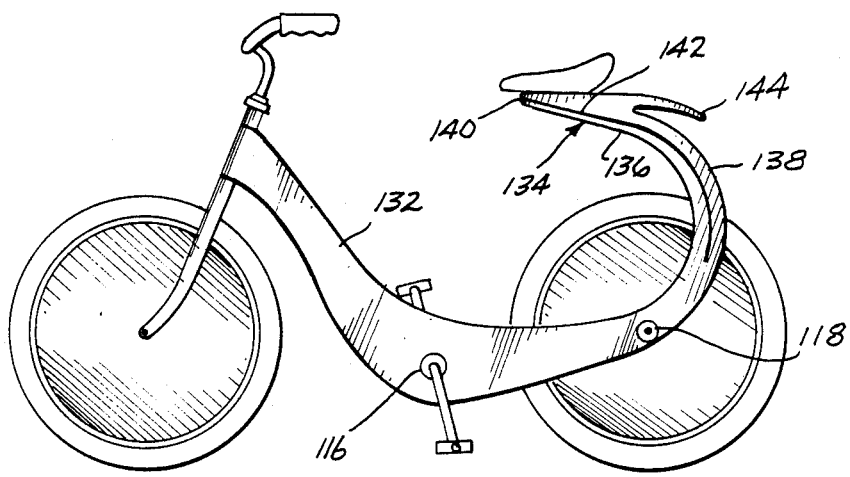
FIG. 10 is a side elevation view of still another embodiment of a bicycle and frame including an integral combination beam seat support made according to the present invention.

Referring now to FIG. 10, another embodiment of a bicycle having a lightweight resin and fiber frame member 132 is disclosed. In this embodiment, the integral combination beam seat support 134 is formed to extend forwardly from the rear wheel area of the bicycle. Again, the combination beam includes a lower portion 136, an upper portion 138, a gap 140 therebetween, and elastomeric material 142 positioned in gap 140. As illustrated, combination beam 134 would be at least partially split to accommodate the rear bicycle wheel and is further shown to include a rearwardly extending fender or spray shield 144. The frame design shown in FIG. 10 would have obvious application as a so-called "girls" bike, i.e., a bicycle not having a high lateral beam 12.

Figure 11:
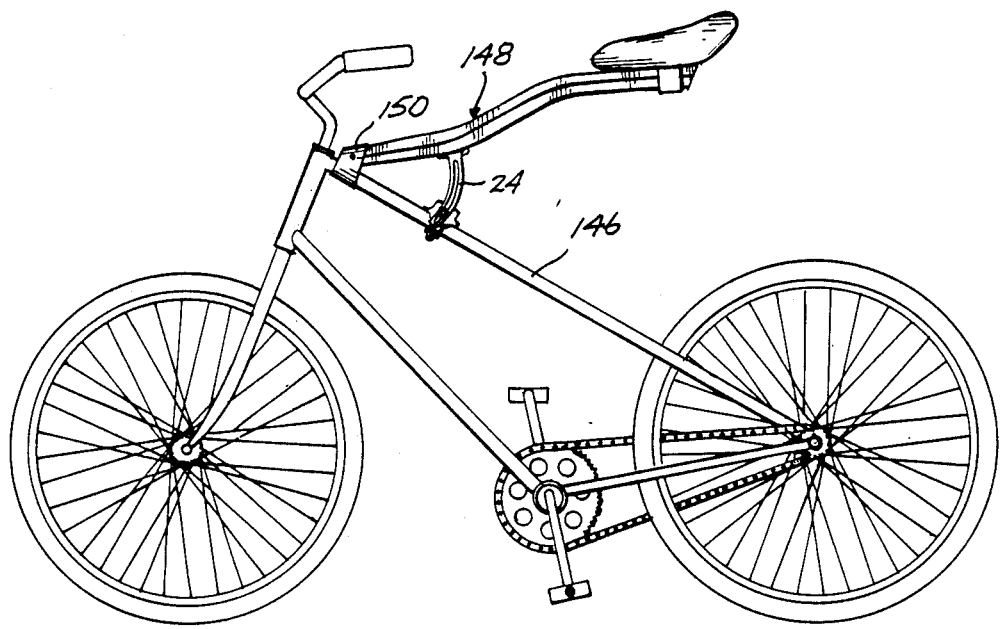
FIG. 11 is a side elevation view of one more embodiment of a bicycle including a cantilever mounted combination beam seat support made according to the present invention.

Referring now to FIG. 11, a bicycle frame design employing metal tube members including a long member 146 extending from the area of the fork to the rear wheel is disclosed. This embodiment, while still making use of metal frame members, reduces the number of such members and changes their shape to better make use of the shock and vibration reducing capabilities of the combination beam seat support 148 shown cantilevered rearwardly from conventional mounting bracket 150 and pivot control 24. Beam 148 is of the same design as beam 10 discussed above with respect to FIGS. 1–6, except for obvious changes needed to mount the beam to tube member 146. An advantage of this design is the reduction in weight of the metal frame due to the redesign of the frame members.

It will be appreciated that rather than limiting the present invention to support a vehicle seat, and in particular a bicycle seat, the present invention may be employed in other situations. For instance, the present invention may be used to support the handlebars of the bicycle thereby absorbing the shock and vibration typically transmitted to the handlebars during riding. In this regard, a vibration damping layer similar to layer 36 may be incorporated into the curved portion of a typical stem used to connect the handlebars to the front fork structure. Alternatively, the vibration damping layer may be incorporated into the construction of the prongs of the front fork of the bicycle. In this contemplated application, the present invention provides essentially the same advantages for the mounting structure for the bicycle handlebars as provided for the seat of the bicycle.

While the preferred embodiments of the invention have been illustrated and described, it will be understood that variations will occur to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A seat support for a vehicle comprising:
a combination beam;
means for mounting said combination beam on said vehicle located at one end of said combination beam; and,
seat means mounted on said combination beam distal from said vehicle mounting means;
said combination beam including;
a first portion having a high modulus of elasticity fixedly connected to said vehicle and a second portion also having a high modulus of elasticity mounted to move with respect to said first portion in response to loads placed on said beam;
said high modulus of elasticity portions including a rigid foam core covered by a skin of resin bound fibers;
said first and second high modulus of elasticity portions including a third elastomeric portion sandwiched therebetween such that the movement of said second portion with respect to said first portion causes said third portion to be deformed and said third elastomeric portion slows the movement of said second portion with respect to said first portion.

2. The seat support of claim 1, wherein said means for mounting said combination beam on said vehicle includes means for cantilevering said beam from said vehicle.

3. The seat support of claim 1, wherein said combination beam is curved along its length.

4. The seat support of claim 1, wherein the first and second portions of said combination beam are fixedly interconnected with each other along their length in an area spaced from the connection of said first portion to said vehicle.

5. The seat support of claim 1, wherein the first and second portions of said combination beam are spaced from each other in the area of the connection of said first portion to said vehicle to define a gap.

6. The seat support of claim 5, wherein said elastomeric material is positioned within said gap and bonded to the adjacent surfaces of said first and second beam portions.

7. The seat support of claim 6, wherein the movement of said second portion of said beam with respect to said first portion causes said third portion to be deformed in shear.

8. A seat support for a vehicle comprising:
a combination beam;
means for mounting said combination beam on said vehicle located at one end of said combination beam; and,
seat means mounted on said combination beam distal from said vehicle mounting means;
said combination beam including:
a first portion having a high modulus of elasticity fixedly connected to said vehicle and a second portion also having a high modulus of elasticity mounted to move with respect to said first portion in response to loads placed on said beam;
said first and second high modulus of elasticity portions a third elastomeric portion sandwiched therebetween such that the movement of said second portion with respect to said first portion causes said third portion to be deformed and said third elastomeric portion shows the movement of said second portion with respect to said first portion;
said high modulus of elasticity portions including a rigid foam core covered by a skin of resin bound fibers;
and, said rigid foam core comprising a polyurethane foam core, said skin of resin bound fibers comprising a skin of epoxy resin bound fiberglass and wherein said elastomeric portion is a polyurethane elastomer.

9. The seat support of claim 8, wherein said means for mounting said combination beam on said vehicle includes means for cantilevering said beam from said vehicle.

10. The seat support of claim 8, wherein said combination beam is curved along its length.

11. The seat support of claim 8, wherein the first and second portions of said combination beam are fixedly interconnected with each other along their length in an area spaced from the connection of said first portion to said vehicle.

12. The seat support of claim 8, wherein the first and second portions of said combination beam are spaced from each other in the area of the connection of said first portion to said vehicle to define a gap.

13. The seat support of claim 12, wherein said elastomeric material is positioned within said gap and bonded to the adjacent surfaces of said first and second beam portions.

14. The seat support of claim 13, wherein the movement of said second portion of said beam with respect to said first portion causes said third portion to be deformed in shear.

* * * * *

UNITED STATES PATENT AND TRADEMARK OFFICE
CERTIFICATE OF CORRECTION

PATENT NO. : 4,934,724

DATED : June 19, 1990

INVENTOR(S) : J.D. Allsop et al.

It is certified that error appears in the above-identified patent and that said Letters Patent is hereby corrected as shown below:

| Column | Line | |
|---|---|---|
| 4  | 68 | After "satisfactory" insert therefor --for-- |
| 5  | 42 | Delete "48" and insert therefor --46- |
| 8  | 52 | Delete "an" and insert therefor --and-- |
| 10 | 51 | After "portions" insert therefor --including-- |

Signed and Sealed this

Twenty-ninth Day of October, 1991

Attest:

HARRY F. MANBECK, JR.

*Attesting Officer*     *Commissioner of Patents and Trademarks*